Patented Sept. 23, 1941

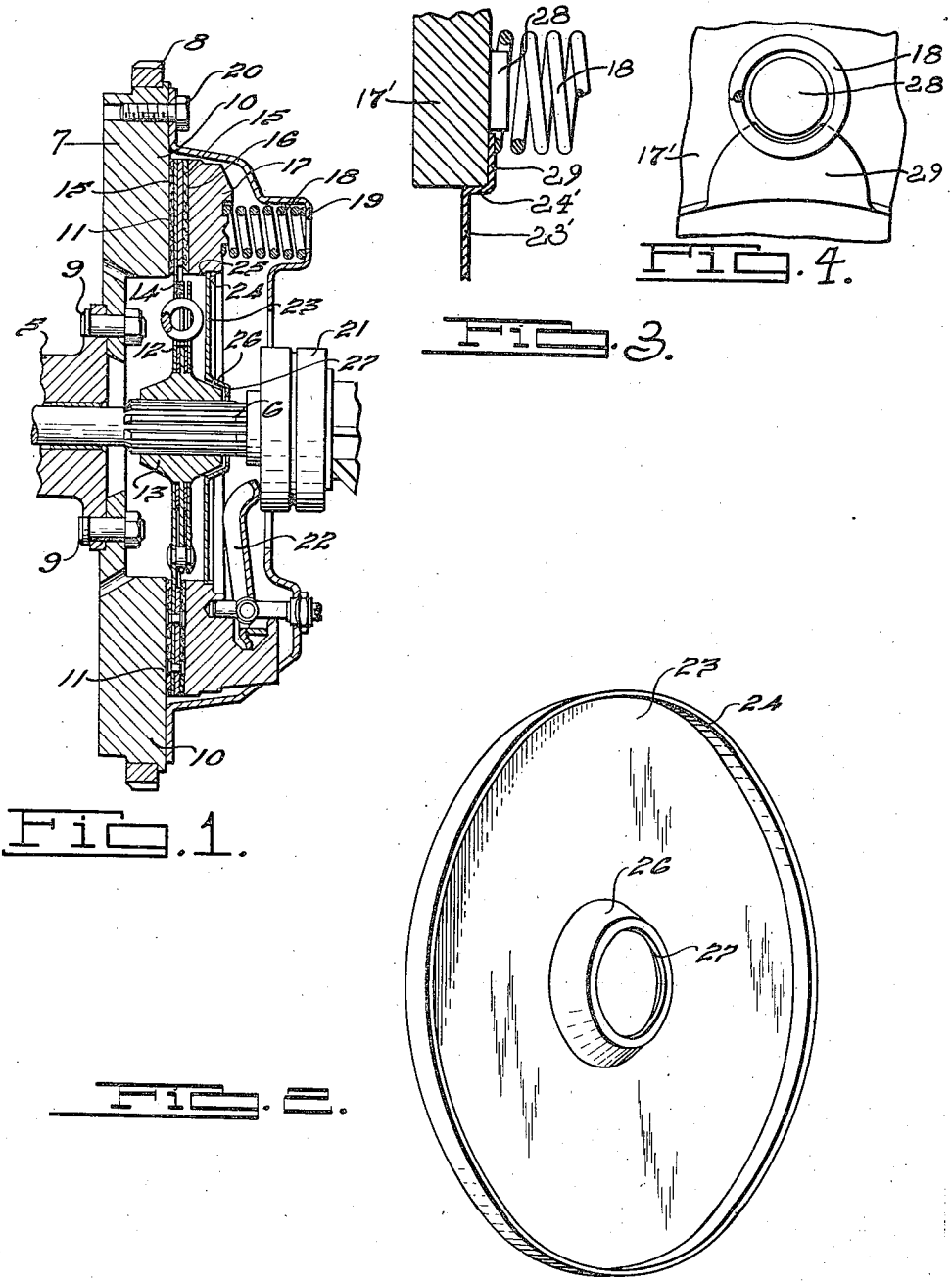

2,256,989

UNITED STATES PATENT OFFICE 2,256,989

CLUTCH

Carlyle Redford, Detroit, Mich., assignor to Chrysler Corporation, Highland Park, Mich., a corporation of Delaware Application August 19, 1937, Serial No. 159,834

11 Claims. (Cl. 192—68)

This invention relates to a clutch and more particularly to improvements in a friction type clutch adapted for use in motor vehicles.

Clutches of this general type are adapted to drivingly connect and disconnect the engine and the speed ratio changing mechanism and include among other things frictionally engageable elements for establishing a friction drive between an element driven by the engine and an element to be driven thereby. Lubricating oil and greases of the engine and speed ratio changing mechanism find their way into the clutch and frequently contact the friction surfaces and as a result thereof there is a slippage between these surfaces with a consequent diminution in the driving torque which would otherwise be transmitted from the engine through the clutch.

An object of the invention is to overcome these difficulties by the provision of an improved clutch having means therein for preventing oil lubricants or other foreign matter from coming in contact with the frictional driving surfaces of the clutch. More particularly the invention has for its object the provision in a clutch of the foregoing type of a baffle or other similar means for preventing oil or lubricants escaping from the speed ratio changing mechanism from contacting the frictional driving surfaces of the clutch.

Other objects of the invention are to provide a baffle or other similar means for the purpose aforesaid which is capable of economical manufacture and assembly; which will not unnecessarily increase the weight of the clutch; and which may be conveniently adapted to those clutches of this type now in general use for the purposes intended.

Further objects and advantages of the invention will be more apparent from the description taken in connection with the accompanying drawing, in which:

Fig. 1 is a transverse sectional view of a clutch embodying the invention.

Fig. 2 is a view in perspective of the baffle member shown in Fig. 1.

Fig. 3 is a fragmentary sectional view illustrating a modified form of the invention.

Fig. 4 is a side elevational view of the modified form shown in Fig. 3.

Referring to the drawing, there is shown a portion of a driving shaft 5 adapted to be driven by an engine (not shown) and a driven shaft 6 operably associated with a speed ratio changing mechanism (not shown). A flywheel 7 having a ring gear 8 thereon is drivingly secured to the shaft 5 by bolts 9 and has an axial extending annular portion 10, the exposed axial end face 11 of which is substantially smooth.

Mounted upon the shaft 6 is a clutch disc 12 having a hub 13 splined thereon. Suitably secured to the hub 13 is a plate member 14 having ring-like facing 15 of suitable friction material secured to the respective opposite faces in radially spaced relation to the hub 13. The friction rings 15 are disposed between the face 11 of the flywheel 7 and a corresponding face 16 of a retractable pressure ring member 17. The ring 17 is urged against the facing 15 by a plurality of circumferentially spaced springs 18 bearing against the ring 17 and the inner face of a clutch cover 19 secured to the flywheel 7 by bolts 20. The cover 19 has a portion thereof extending generally radially with respect to the shaft 6 which portion is provided with an opening for accommodating axial movement of a collar 21 on the shaft 6 for oscillating a plurality of pivotally mounted fingers, one of which is shown at 22, for moving the pressure ring member 17 to the right, as viewed in Fig. 1, against the springs 18 for disconnecting the drive between the shafts 5 and 6 in the well known manner. The cover 19 serves as an abutment for the springs 18. As is well known with respect to this type of clutch, the engine drive is transmitted from the shaft 5 to the shaft 6 by means of frictional engagement of the opposed faces of the flywheel and pressure ring with the friction rings 15 of the clutch plate.

This invention has particular reference to the provision of means for preventing oil and greases escaping from the speed ratio changing mechanism (not shown but associated with the shaft 6 in the well known manner), or from other sources, from contacting the aforesaid frictional surfaces. As one means for accomplishing this, there is provided a disc-shaped baffle member 23 spaced axially of the clutch plate in the direction of the speed ratio changing mechanism (not shown). The baffle 23 is preferably carried by the pressure member 17 and extends radially between the inner face thereof and the shaft 6 and has an annular axially extending flange 24 seated against a shoulder 25 formed in the inner face of the ring 17. These contacting surfaces are suitably secured together such as by welding or if desired the baffle may be press fitted into the ring. The baffle 23 is further provided with a central opening for accommodating the shaft 6, the opening being defined by an annular axially extending portion 26 overlapping a portion of the hub 13 of the clutch disc 22 and terminating in a radial flange 27 which is disposed rearwardly of the hub 13 and between the latter and the change speed ratio mechanism (not shown). Thus a baffle is provided in the space between the pressure plate 17 and the shaft 6 adjacent the clutch disc 12 and the likelihood of oil and grease, which may escape from sources adjacent the clutch, gaining access to the friction ring is minimized.

In the embodiment of the invention shown in Figs. 3 and 4, the baffle 23' is retained in assembled position by the springs 18 which urge the ring-shaped pressure plate 17' against the friction ring 15, as shown in Fig. 1. Circumferentially spaced axially extending bosses are provided on the pressure plate 17', one of such bosses being shown at 28, for positioning the respective springs 18.

The baffle 23' has an annular axially extending flange 24' which abuts a generally axially extending face of the ring 17'. Formed on the peripheral edge of the baffle 23' are a plurality of circumferentially spaced radially extending lugs, one of which is shown at 29, against which a respective spring 18 bears for retaining the baffle 23' in assembled position.

The baffle is preferably formed from relatively light weight sheet metal stock by a suitable stamping operation and the weight thereof does not materially increase the weight of the clutch. Sufficient clearance is provided between the baffle and clutch fingers 22 to permit oscillation of the latter.

Although but one specific embodiment of the invention is herein shown and described, it will be understood that various changes in the size, shape and arrangement of parts may be made without departing from the spirit of the invention.

What I claim is:

1. A clutch having a driving member, a substantially ring-shaped pressure plate rotatable with said driving member, a driven member between said driving member and said pressure plate, a shaft rotatable with said driven member, yielding means for urging said pressure plate axially of said shaft, and a closure member extending radially between said pressure plate and said shaft, said closure member having an axially extending flange abutting an axially extending face of said pressure plate and a radially extending flange abutting a correspondingly extending face of said pressure plate, said yielding means urging said radial flange into engagement with said pressure plate.

2. In a clutch mechanism for driving and driven members, a substantially ring-shaped pressure member radially spaced from and axially movable relative to said members, a clutch plate between said driven member and said pressure member and having a hub mounted on said driven member, and a disc extending radially between said pressure member and said driven member, said disc having an axially extending flanged outer portion engaging said pressure member and a flanged inner portion disposed in relatively close proximity to and in overlapping relationship with said hub.

3. In a clutch mechanism for driving and driven members, a relatively heavy ring-like pressure member radially spaced from and movable axially with respect to said driven member, means yieldably urging said pressure member in one direction of its axial movement, abutment means for said yieldable means having a flanged portion extending generally radially with respect to said driven member, a clutch plate having a portion thereof disposed between said driving member and said pressure member, a hub for mounting said clutch plate on said driven member, and a sheet metal closure member extending radially between adjacent faces of said pressure member and said hub and disposed axially between said clutch plate and said abutment means, the main body portion of said closure member being disposed axially between the clutch disc and the face of the pressure member opposite the latter.

4. In a clutch mechanism for driving and driven members, a relatively heavy ring-like pressure member radially spaced from and movable axially with respect to said driven member, means yieldably urging said pressure member in one direction of its axial movement, abutment means for said yieldable means having a flanged portion extending generally radially with respect to said driven member, a clutch plate having a portion thereof disposed between said driving member and said pressure member, a hub for mounting said clutch plate on said driven member, and a sheet metal closure member extending radially between adjacent faces of said pressure member and said hub and disposed axially between said clutch plate and said abutment means and adjacent the face of said pressure member opposite said clutch plate, said yielding means engaging an outer peripheral portion of said closure member.

5. In a clutch mechanism for driving and driven members, a relatively heavy ring-like pressure member radially spaced from and axially movable with respect to said driven member, means yieldably urging said pressure member in one direction of its axial movement, abutment means for said yieldable means, a clutch disc mounted on said driven member and extending radially therefrom, said disc having a portion thereof disposed between said driving member and said pressure member, and a sheet metal closure member extending radially between said driven member and said pressure member, said closure member being disposed axially between said clutch plate and said abutment means and adjacent the face of said pressure member opposite said clutch disc.

6. A clutch having a driving member, a pressure ring rotatable with said driving member, a driven member between said driving member and said pressure ring, a shaft rotatable with said driven member, yielding means for urging said pressure ring axially with respect to said shaft, a cover member secured to said driving member and having a portion thereof extending generally radially with respect to said shaft and forming an abutment for said yielding means, and a closure member extending radially between said pressure ring and said shaft and disposed axially between said driven member and said abutment, said closure member having a portion thereof overlapping a radially extending face portion of said pressure member and engaged by said yielding means, the main body portion of said closure member being disposed in a plane bounded by the axially opposite extremities of said pressure ring.

7. In a clutch mechanism for driving and driven members, a relatively heavy ring-like pressure member radially spaced from and axially movable with respect to said driven member, means yieldably urging said pressure member in one direction of its axial movement, a cover member having a portion thereof extending generally radially with respect to said driven member and forming an abundant means for said yieldable means, a clutch disc mounted on said driven member and extending radially therefrom, said disc having a portion thereof disposed between said driving member and said pressure member, means including a pivotally mounted element disposed axially intermediate said abutment means and said clutch disc for moving said pressure member axially against said yielding means, and a sheet metal closure member extending radially between said driven member and said pressure member and disposed axially between said clutch plate and said pivotally mounted element, said closure member accommodating pivotal movement of said element in a direction toward said clutch plate.

8. In a friction clutch, in combination with a pressure plate, a cover plate and springs engaged between said plates at points spaced circumferentially thereof, whereby to urge said plates relatively away from one another, a baffle plate disposed between said pressure plate and said cover plate, said baffle plate having peripheral portions engaged between one of said plates and said springs and being thereby supported.

9. In a friction clutch, in combination with an annular pressure plate, a shaft extending axially therethrough and spaced therefrom by an annular opening, and circumferentially spaced springs engaging said pressure plate for moving it in clutch engaging direction, a baffle plate covering said annular opening, said baffle plate having on its periphery radially extending ears engaged between said springs and said pressure plate and being thereby supported.

10. In a friction clutch, in combination with a shaft, an annular pressure plate having a central opening of larger diameter than said shaft through which said shaft extends so as to form an annular space, and springs engaged against said plate for moving the same in clutch engaging direction; a baffle plate traversing said annular space, said baffle plate having a peripheral rim portion fitted against the inner edge region of said pressure plate, a central opening receiving said shaft, and having means projecting radially outwardly from said rim portion and engaged between the ends of said springs and said pressure plate, whereby to support said baffle plate.

11. In a friction clutch, in combination with a driven member, a pressure plate and circumferentially spaced springs engaged against said pressure plate for moving it in clutch engaging direction, a baffle plate arranged to intercept oil or foreign matter moving in the direction of said driven member, said baffle plate having on its periphery radially extending ears engaged between said springs and said pressure plate and being thereby supported.

CARLYLE REDFORD.

CERTIFICATE OF CORRECTION.

Patent No. 2,256,989. September 23, 1941.

CARLYLE REDFORD.

It is hereby certified that error appears in the printed specification of the above numbered patent requiring correction as follows: Page 1, second column, line 54, for "disc 22" read --disc 12--; page 3, first column, line 2, claim 7, for the word "abundant" read --abutment--; and that the said Letters Patent should be read with this correction therein that the same may conform to the record of the case in the Patent Office.

Signed and sealed this 25th day of November, A. D. 1941.

Henry Van Arsdale,
Acting Commissioner of Patents.

(Seal)